July 4, 1950  C. J. THOMPSON  2,514,106
TEMPERATURE MEASURING APPARATUS
Filed Oct. 25, 1948
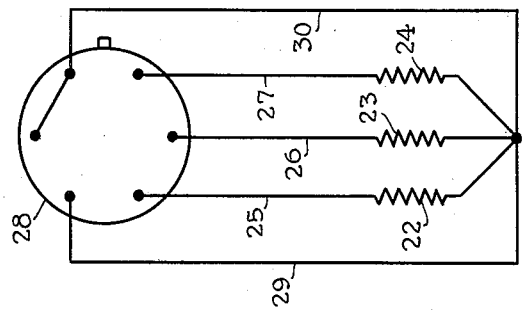
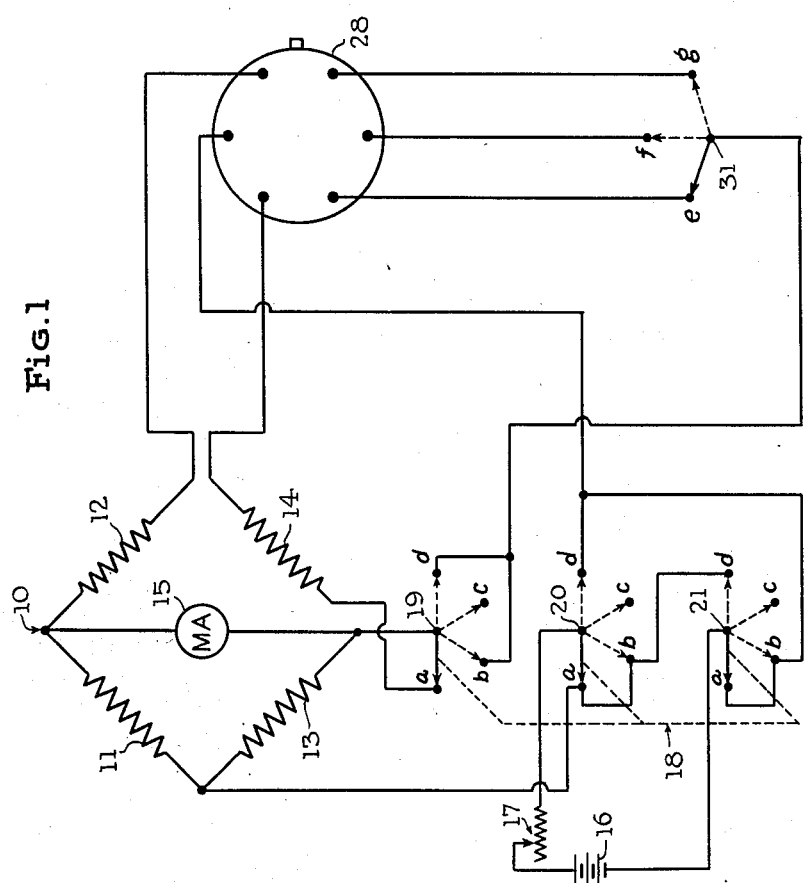
Inventor
Clifford J. Thompson
By
Attorney.

Patented July 4, 1950

2,514,106

UNITED STATES PATENT OFFICE 2,514,106

TEMPERATURE MEASURING APPARATUS

Clifford J. Thompson, Davenport, Fla., assignor to Fruit Growers Express Company Application October 25, 1948, Serial No. 56,309

3 Claims. (Cl. 73—342)

This invention relates to electrical temperature measuring apparatus and more particularly to a portable resistance type apparatus for use in measuring temperatures at spaced points within a closed structure, such e. g. as a refrigerated railway vehicle for the transportation of perishable commodities.

The circuit disclosed herein is designed primarily for use with apparatus of the type shown and described in my copending application Serial No. 677,391, which was filed on June 17, 1946, now Patent No. 2,457,751. It will be apparent, however, that my invention is capable of use in other types of electrical temperature measuring apparatus.

One of the objects of my invention is to compensate for the errors in temperature measurements due to unequal resistances of leads from the temperature sensitive resistors to the bridge.

Another object is to provide a new and unique circuit of the Wheatstone bridge type for use in temperature measuring apparatus which is capable of measuring positive as well as negative temperatures on the same scale of the same indicating meter.

It is a further object to retain all the features of portability and power consumption only while in actual use which are contained in the disclosure of my prior application mentioned above.

The accompanying drawing shows a preferred embodiment of the circuit of my invention in which:

Figure 1 shows the circuit of the apparatus itself, and

Figure 2 shows the connection of the temperature-sensitive resistors within a closed structure.

Referring to Figure 1, the Wheatstone bridge circuit, denoted generally by the reference numeral 10, is composed of three fixed resistors of which 11 and 12 are the ratio arms, 13 the balance arm, and 14 the test or calibrating resistor. The indicating instrument 15 is a D'Arsonval type milliammeter having a graduated scale of temperature in degrees, e. g., Fahrenheit. The source of potential 16 is an ordinary dry cell battery or batteries and has a variable resistor 17 in series with it and the bridge circuit for calibrating purposes. A gang switch 18 has three identical sections 19, 20, and 21, each of which has four positions a, b, c, and d. This switch serves to connect the test resistor to the bridge, to disconnect the test resistor, and reverse the polarity of the source of potential applied to the bridge circuit.

The temperature-sensitive resistors 22, 23, and 24 (Figure 2) are located at spaced points within a closed structure and the leads 25, 26, and 27 join one end of each of these resistors to the terminals of a plug-in type fitting or receptacle 28. The leads 29 and 30 join the opposite ends of the temperature-sensitive resistors to other terminals of receptacle 28. Leads 25, 26, 27, 29, and 30 are made substantially equal in length, and the same type wire is used for each. The other half of receptacle 28 is mounted on the apparatus housing the circuit which is shown in Figure 1. The three position switch 31 serves to connect selectively, in place of test resistor 14, the temperature-sensitive resistors 22, 23, and 24 by placing the switch in positions e, f and g, respectively. This allows successive measurements of temperature at the points at which these resistors are located within the closed structure.

It should be noted that the supply circuit from the source of potential 16 to the bridge 10 is not closed until the apparatus is plugged-in by means of the receptacle 28, one half of which is mounted on the apparatus and the other half of which is mounted on the closed structure, the interior temperatures of which are to be measured. In all positions of the switch 18, save the off or c position, one side of battery 16 is always connected to the bridge circuit 10 at the junction of resistors 11 and 13. The other side of the battery is always connected to a terminal on receptacle 28 and the circuit is completed to the other side of the bridge only through leads 29 and 30 which are within the closed structure.

Operation

From the foregoing, it should be clear to those skilled in the art that this temperature measuring bridge circuit works on an unbalanced rather than a balanced condition. The extent of unbalance as indicated by the meter 15 is directly proportional to the resistance of the temperature-sensitive resistor which is in the bridge circuit at the time. It is, therefore, a simple matter to calibrate the meter 15 directly in terms of temperature.

With the apparatus plugged-in, the battery circuit to the bridge is complete. Switch 18 is turned first to its extreme lefthand position. Test resistor 14, together with leads 29 and 30, then constitutes one arm of the bridge 10. For the purposes of illustration, we can assume that meter 15 has a graduated scale of temperatures from zero to one hundred degrees Fahrenheit, and that resistor 14 has been chosen to be equal in resistance to the resistance which one of the temperature-sensitive resistors would have at 100° F. With the bridge circuit completed as above, the variable resistance 17 is set at a point at which the meter 15 shows a full scale deflection or 100° F. The apparatus is thus easily and quickly calibrated. Switch 18 may then be turned to its next position. Resistor 14 is now disconnected from the bridge by section 19 of switch 18. By operating the selector switch 31, the temperature-sensitive resistors 22, 23, or 24 may be successively connected to the bridge, in place of resistor 14, through their associated leads 25, 26, and 27 and through lead 30. Since as stated above, lead 30 is equal in length, cross-section, and material to leads 25, 26, and 27, the temperature-sensitive resistors are connected to the bridge through lead resistances which are substantially identical to those used for connecting the test resistor 14. Errors which would otherwise be introduced due to unequal lead resistances are, therefore, cancelled out. It should be noted that lead 30 is in series with the test resistor and which any of temperature-sensitive resistors as part of one arm of the bridge. Thus, the only error due to lead resistance will lie in difference of resistance between lead 29 and leads 25, 26, or 27. By making these leads of the same wire and of substantially equal length, this error is minimized to a degree that renders it negligible. It should be further noted that all of these leads are within the closed structure and, therefore, not affected by the outside ambient temperatures to which the apparatus itself is subjected.

The next position of switch 18 is a neutral or off position which is included as a matter of convenience. Should the operator have occasion to leave the apparatus plugged in, he can shut off the supply of current to the bridge by turning switch 18 to this position.

The last position which is shown by the drawing, as the extreme righthand position of switch 18, reverses the polarity of the potential applied to the bridge. This position is provided to make the range of the apparatus equal to twice that of the scale of the indicating instrument. When switch 18 is turned to this position, temperatures from zero degrees to minus one hundred degrees Fahrenheit can be read on the same scale of meter 15. This is so because in the example given, the bridge would be balanced when connected to a temperature-sensitive resistor located in an area the temperature of which is zero. Temperature-sensitive resistors located in areas the temperatures of which are above or below zero will cause an unbalance of the bridge. Depending on whether above or below zero, the unbalance produced will tend to deflect the meter to the right or left. Since the meter is of the type which can be deflected in one direction only, a reversal of the polarity of supply to the bridge will reverse the flow of current through the meter, thus making it possible to use, e. g., a zero to one hundred degrees scale, but having actually a total range of two hundred degrees. The advantages of this circuit arrangement over one having a zero center type indicating instrument are obvious. A larger scale permits of greater reading accuracy and, therefore, with the same physical size of meter an extended range with better accuracy results.

It will be apparent that I have shown only one preferred embodiment of my invention in the attached drawing. As many temperature-sensitive resistors as desired could be used, for example, and the only necessary change would be additional terminals on switch 31 and on the plug-in receptacle 28. The apparatus could also be calibrated in degrees of any temperature scale other than Fahrenheit and the range could be either greater or less than zero to one hundred.

I claim:

1. Electrical resistance type temperature measuring apparatus of the portable plug-in type, adapted to be connected successively to each of a plurality of temperature sensitive resistors located at spaced points within a closed structure, each resistor having associated leads of substantially equal length connected to terminals in a receptacle mounted for access from outside said closed structure, comprising in combination: a Wheatstone bridge circuit and an indicating instrument therefor; a source of variable potential for said bridge circuit; a test resistor for said bridge circuit; a pair of leads within said structure also connected to terminals on the receptacle each having a length substantially equal to those connecting the temperature sensitive resistors to the receptacle, said pair of leads being joined at their remote ends within the structure and connected at their point of jointure to the remote ends of the temperature sensitive resistors; a plug-in jack electrically connected to said bridge and adapted to mate with said receptacle to afford means for connecting said temperature sensitive resistors in said bridge; and means including a plurality of switches operative when said jack is plugged in said receptacle to connect said test resistor to said bridge through said pair of leads and to selectively substitute for said test resistor in said bridge circuit, the temperature sensitive resistors through their associated leads and one of said pair of leads.

2. Electrical resistance type temperature measuring apparatus of the portable plug-in type, adapted to be connected successively to each of a plurality of temperature sensitive resistors located at spaced points within a closed structure, each resistor having associated leads of substantially equal length connected to terminals in a receptacle mounted for access from outside said closed structure, comprising in combination: a Wheatstone bridge circuit and an indicating instrument therefor, said bridge including three fixed resistors connected to form three arms thereof; a source of potential for said bridge and a variable resistor in series therewith; a pair of leads within said structure also connected to terminals on said receptacle, each having a length substantially equal to those connecting the temperature sensitive resistors to the receptacle, said pair of leads being joined at their remote ends within the said structure and connected at their point of jointure to the remote ends of the temperature sensitive resistors; a test resistor for said bridge; a plug-in jack electrically connected to said bridge and adapted to mate with said receptacle to afford means for connecting said temperature sensitive resistors to said bridge; and means including a plurality of switches operative when said jack is plugged in said receptacle to connect said test resistor in series with said pair of leads to said bridge as the fourth arm thereof and to selectively substitute for said test resistor in the bridge circuit, the temperature sensitive resistors through their associated leads and one of said pair of leads.

3. Electrical resistance type temperature measuring apparatus of the portable plug-in type, adapted to be connected successively to each of a plurality of temperature sensitive resistors located at spaced points within a closed structure, each resistor having associated leads of substantially equal length connected to terminals in a receptacle mounted for access from outside said closed structure, comprising in combination: a Wheatstone bridge circuit and an indicating instrument therefor, said bridge including three fixed resistors connected to form three arms thereof; a pair of leads within said structure also connected to terminals on said receptacle, each having a length substantially equal to those connecting the temperature sensitive resistors to the receptacle, said pair of leads being joined at their remote ends within the said structure and connected at their point of jointure to the remote ends of the temperature sensitive resistors; a source of potential for said bridge and a variable resistor in series therewith; a test resistor for said bridge; a plug-in jack electrically connected to said bridge and adapted to mate with said receptacle to afford means for connecting said temperature sensitive resistors to said bridge; first switching means operative when said jack is plugged into said receptacle to selectively connect said temperature sensitive resistors to said bridge; second switching means operative when said jack is plugged into said receptacle to connect said test resistor to said bridge circuit through said pair of leads, to substitute for said test resistor, said temperature sensitive resistors through their associated leads, said first switching means and one of said pair of leads and to reverse the polarity of potential applied to the bridge.

CLIFFORD J. THOMPSON.

REFERENCES CITED

The following references are of record in the file of this patent:

UNITED STATES PATENTS

| Number | Name | Date |
|---|---|---|
| 1,537,281 | Wunsch | May 12, 1925 |
| 1,867,870 | Baker et al. | July 19, 1932 |
| 2,069,509 | Stickney | Feb. 2, 1937 |

FOREIGN PATENTS

| Number | Country | Date |
|---|---|---|
| 466,391 | Great Britain | May 27, 1937 |